(12) United States Patent
Toriida et al.

(10) Patent No.: US 8,288,058 B2
(45) Date of Patent: Oct. 16, 2012

(54) BINDER FOR FUEL CELL, COMPOSITION FOR FORMING ELECTRODE, ELECTRODE, AND FUEL CELL USING THE ELECTRODE

(75) Inventors: Masahiro Toriida, Sodegaura (JP); Junichi Ishikawa, Ichihara (JP); Takehiko Omi, Chiba (JP); Satoko Fujiyama, Kisarazu (JP); Kuniyuki Takamatsu, Ichihara (JP); Shoji Tamai, Chiba (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 1245 days.

(21) Appl. No.: 11/658,178

(22) PCT Filed: Jul. 21, 2005

(86) PCT No.: PCT/JP2005/013389
§ 371 (c)(1),
(2), (4) Date: Mar. 7, 2007

(87) PCT Pub. No.: WO2006/009206
PCT Pub. Date: Jan. 26, 2006

(65) Prior Publication Data
US 2007/0292733 A1 Dec. 20, 2007

(30) Foreign Application Priority Data

Jul. 23, 2004 (JP) ................. 2004-215469

(51) Int. Cl.
*H01M 4/02* (2006.01)
*H01M 4/36* (2006.01)
*B05D 5/12* (2006.01)
(52) U.S. Cl. ......... 429/529; 429/523; 429/530; 427/115
(58) Field of Classification Search ............ 429/33, 429/523, 529, 530; 427/115
See application file for complete search history.

(56) References Cited

U.S. PATENT DOCUMENTS

2002/0091225 A1 * 7/2002 McGrath et al. ............. 528/170
(Continued)

FOREIGN PATENT DOCUMENTS

CA 2442686 A1 10/2002
(Continued)

OTHER PUBLICATIONS

Machine translation of JP 2004047244 A, Onomi et al., Feb. 2004.*

(Continued)

*Primary Examiner* — Basia Ridley
*Assistant Examiner* — Sean P Cullen
(74) *Attorney, Agent, or Firm* — Buchanan Ingersoll & Rooney PC (57) ABSTRACT

This invention provides a binder for a fuel cell which has high adhesion, low methanol solubility, high methanol permeability and high proton conductivity, a composition for electrode formation, an electrode for a fuel cell, and a fuel cell using them. The binder is particularly suitable for a binder for a direct methanol type fuel cell which requires high proton conductivity.

The binder for a fuel cell comprises a block copolymer which comprises a block having a repeating structural unit of a divalent aromatic group that contains a protonic acid group and a block having a repeating structural unit of a divalent aromatic group that does not contain a protonic acid group, and which has a glass transition temperature (Tg) of 180° C. or less. In particular, it is preferable that the block copolymer has an ion exchange group equivalent of from 200 to 1,000 g/mole and a weight retention ratio of 90% or more as measured by immersion in a 64 weight % aqueous methanol solution at 25° C. for 24 hours.

2 Claims, 2 Drawing Sheets

U.S. PATENT DOCUMENTS

2006/0182678 A1  8/2006  Shinoda et al.

FOREIGN PATENT DOCUMENTS

| EP | 1 555 282 A1 | 7/2005 |
| JP | 2002-184420 A | 6/2002 |
| JP | 2002-237315 A | 8/2002 |
| JP | 2002-289222 A | 10/2002 |
| JP | 2003-31231 A | 1/2003 |
| JP | 2003-109624 A | 4/2003 |
| JP | 2003-317735 A | 11/2003 |
| JP | 2004-47244 A | 2/2004 |
| JP | 2004-359925 A | 12/2004 |
| WO | WO 03/033566 A1 | 4/2003 |
| WO | WO 03082956 A1 * | 10/2003 |
| WO | WO 2004/035662 A1 | 4/2004 |
| WO | WO 2004/042839 A2 | 5/2004 |

OTHER PUBLICATIONS

Feng Wang et al., "Sodium Sulfonate-Functionalized Poly(Ether Ether Ketone)s", Macromol. Chemical Phys., 1998, pp. 1421-1426, vol. 199.

Supplementary European Search Report EP 05 76 6321 dated Dec. 17, 2009.

Reasons for Rejection issued Mar. 11, 2008 in corresponding Japanese Patent Application No. 2006-529274, together with an English translation thereof.

* cited by examiner

BINDER FOR FUEL CELL, COMPOSITION FOR FORMING ELECTRODE, ELECTRODE, AND FUEL CELL USING THE ELECTRODE

TECHNICAL FIELD

The present invention relates to a binder used for a fuel cell or the like using hydrogen, alcohol or the like as a fuel, a composition for forming an electrode containing the binder, an electrode for a fuel cell, and a fuel cell using the same.

BACKGROUND ART

A polymer electrolyte type fuel cell refers to a fuel cell using a proton conductive polymer as an electrolyte that takes out energy from a fuel such as hydrogen, methanol or the like by converting chemical energy of the fuel into electrical energy, by electrochemically oxidizing the fuel by means of oxygen or air. The polymer electrolyte type fuel cells include a type that uses pure hydrogen supplied from a steel bottle, pipe or the like as a fuel, and a type that generates hydrogen from gasoline or methanol using a reformer and uses the hydrogen as a fuel. Furthermore, there has also been developed a direct methanol type fuel cell (DMFC) that directly generates power using an aqueous methanol solution as a fuel. The DMFC, which does not require a reformer for generating hydrogen, can have a simple and compact system and has been gathering attention particularly as a power supply for portable equipment.

The polymer electrolyte type fuel cell is composed of a polymer electrolyte membrane, and positive and negative electrodes that are arranged so as to be in contact with both sides of the polymer electrolyte membrane. Hydrogen or methanol as a fuel is electrochemically oxidized at the negative electrode to generate protons and electrons. The proton moves through the polymer electrolyte membrane to the positive electrode where oxygen is supplied. On the other hand, the electron generated at the negative electrode flows into the positive electrode via a load connected to the fuel cell, and water is generated by reaction of the proton with the electron at the positive electrode. For this reason, high proton conductivity is required for a polymer material used for the electrolyte membrane, a binder for binding the membrane and the electrodes, a binder for fixing a catalyst that accelerates oxidation of hydrogen or methanol and reduction of oxygen, or the like. Further, the electrolyte membrane requires properties for shielding hydrogen or methanol as a fuel. However, conversely, a binder for fixing a catalyst for an electrode requires properties to allow methanol to permeate, since the fuel needs to be supplied to the catalyst. Meanwhile, when adhesion at an interface between the electrolyte membrane and an electrode or an interface between the catalyst and the binder is insufficient, conduction of the proton is inhibited. Therefore, the polymer materials used for these require high adhesion.

As the polymer material having high proton conductivity, a protonic acid group-containing fluorinated polymer compound such as a product named Nafion (registered trademark, produced by DuPont Kabushiki Kaisha), a polymer membrane, produced by Dow Chemical Co., or the like is known. However, the protonic acid group-containing fluorinated polymer compound has problems such as being very expensive, generating fluoric acid gas when it is burned at the time of disposal, being unsuitable for a polymer electrolyte membrane for DMFC because of low methanol shielding properties of the membrane, and having proton conductivity that rapidly drops under high temperature and low humidity.

On the other hand, non-fluorinated polymer electrolyte materials using a protonic acid group-containing hydrocarbon type polymer compound have also been under development. The protonic acid group-containing hydrocarbon type polymer compound is known for low production cost, no generation of halogen type gas upon incineration, and small decrease in proton conductivity under high temperature and low humidity. However, for example, it is known that sulfonated polystyrene has cell properties that deteriorate over time since a tertiary carbon in its main chain is susceptible to attack by a radical and hydrogen is easily emitted at an α position in a cell.

For this reason, a large number of protonic acid group-containing polymer compounds which do not have an aliphatic chain in a main chain, that is, aromatic hydrocarbon type polymer compounds, have been developed (for example, Non-patent Document 1). Among these compounds, it has been reported that a membrane composed of sulfonated aromatic polyether is excellent in heat resistance and chemical durability so that it can be used as a polymer electrolyte membrane for a long time. Further, a crosslinked membrane of sulfonated aromatic polyether in which inter-molecular chains are crosslinked has excellent water resistance and methanol solubility resistance, satisfying both methanol shielding property and proton conductivity at the same time. Thus, it is suitable for use in a polymer electrolyte membrane for DMFC (for example, Patent Document 1).

However, a fuel cell using a protonic acid group-containing aromatic hydrocarbon type polymer compound has a problem of deterioration of cell properties due to fluctuation in humidity or temperature. This is considered to be because of detachment at an interface of a membrane and an electrode or an interface of a catalyst and a binder, resulting from repeated expansion and contraction of the proton conductive material caused by fluctuation in the humidity or temperature. Such a problem is conspicuous, in particular, when a protonic acid group-containing fluorinated polymer compound is used as a binder. Since the glass transition temperature of the protonic acid group-containing fluorinated polymer compound is low, about 140° C. in the case of Nafion, a membrane and an electrode can be tightly heat-fused by heat pressing when the polymer electrolyte membrane is a protonic acid group-containing fluorinated polymer compound. However, when the polymer electrolyte membrane is a protonic acid group-containing aromatic hydrocarbon type polymer compound, detachment at an interface easily occurs due to low affinity with the protonic acid group-containing fluorinated polymer compound in the binder.

Methods for preventing detachment include use of a membrane having strong adhesion or a binder having high adhesion. As a membrane having strong adhesion, a membrane with a reformed surface, e.g. a membrane with a roughened surface (for example, Patent Document 2), a membrane with a surface hydrophilized by performing a discharge treatment (for example, Patent Document 3) and the like have been reported. However, sufficient effects of improving adhesion have not been achieved.

On the other hand, several polymer electrolyte membranes or binders using a protonic acid group-containing aromatic hydrocarbon type polymer compound are known (for example, Patent Documents 4 and 5). However, polymer compounds described in these documents have a glass transition temperature of 200° C. or more. Therefore, when a polymer compound having such a high glass transition temperature is used as a binder, there is a problem in that the binder cannot be attached to an electrode if the temperature is not high. On the other hand, the protonic acid group has low thermal stability and is eliminated at relatively low temperature, and as a result, there is a problem such that it cannot be strongly melt-adhered to an electrode. For this reason, a binder using a protonic acid group-containing aromatic hydrocarbon type polymer compound having good adhesion has been demanded.

An object of the present invention is to provide a binder for a fuel cell having excellent adhesion, high methanol permeability and high proton conductivity. Furthermore, the present invention provides a composition for forming a fuel cell electrode using the binder, an electrode for a fuel cell, and a fuel cell.

Patent Document 1: WO 03/0033566
Patent Document 2: Japanese Patent Application Laid-open No. 2003-317735
Patent Document 3: Japanese Patent Application Laid-open No. 2002-237315
Patent Document 4: Japanese Patent Application Laid-open No. 2004-359925
Patent Document 5: Japanese Patent Application Laid-open No. 2004-47244
Non-patent Document 1: Macromol. Chem. Phys., Vol. 199, pp. 1421-1426 (1998)

DISCLOSURE OF THE INVENTION

An object of the present invention is to provide a binder for a fuel cell having high adhesion, low methanol solubility, high methanol permeability and high proton conductivity, a composition for forming an electrode, an electrode for a fuel cell and a fuel cell using the same. In particular, the present invention provides a binder suitable for a direct methanol type fuel cell requiring high proton conductivity.

Means for Solving the Problem

The present invention relates to a binder for a fuel cell comprising a block copolymer which includes a block having a repeating structural unit of a divalent aromatic group that contains a protonic acid group and a block having a repeating structural unit of a divalent aromatic group that does not contain a protonic acid group, and which has a glass transition temperature (Tg) of 180° C. or less. The above block copolymer preferably has an ion exchange group equivalent of from 200 to 1,000 g/mole and a weight retention ratio of 90% or more as measured by immersion in a 64 weight % aqueous methanol solution at 25° C. for 24 hours, and preferably contains repeating structural units represented by the general formulae (1) and (2), wherein, in the general formulae (1) and (2), $X^1$ to $X^5$ each independently represent a hydrogen atom or a protonic acid group; at least one of $X^1$ to $X^5$ is a protonic acid group; $A^1$ to $A^4$ each independently represent a direct bond, $-CH_2-$, $-C(CH_3)_2-$, $-C(CF_3)_2-$, $-O-$, $-SO_2-$ or $-CO-$; g, h, i, j, k and l each independently represent 0 or 1; and a hydrogen atom of an aromatic ring may be substituted with $-C_mH_{2m+1}$ (m represents an integer of from 1 to 10), $-Cl$, $-F$, $-CF_3$ or $-CN$.

Further, the present invention relates to a binder for a fuel cell, a composition for forming a fuel cell electrode containing an electrode material, an electrode for a fuel cell comprising the composition for a fuel cell electrode and a fuel cell using the electrode for a fuel cell.

Effect of the Invention

Since the binder for a fuel cell of the present invention has low methanol solubility, high methanol permeability, high proton conductivity and a relatively low glass transition temperature, the fuel cell using an electrode composed of the binder for a fuel cell of the present invention exhibits excellent performances over a long period of time because of favorable bonding properties with an electrolyte membrane and infrequent occurrence of detachment of the electrode from the electrolyte membrane. Thus, the binder for a fuel cell according to the present invention is particularly suitable as a binder for forming an electrode of a direct methanol type fuel cell that requires particularly high proton conductivity.

BEST MODE FOR CARRYING OUT THE INVENTION

Block Copolymer

The block copolymer contained in the binder for a fuel cell according to the present invention comprises a block having a repeating structural unit of a divalent aromatic group that contains a protonic acid group and a block having a repeating structural unit of a divalent aromatic group that does not contain a protonic acid group, and which has a glass transition temperature (Tg) of 180° C. or less.

In the present invention, the divalent aromatic group refers to a divalent aromatic ring and an aromatic group in which the aromatic rings are bonded to each other by a linking group. Examples of the divalent aromatic ring include the following groups.

[Chemical Formula 1]

(1)

(2)

These aromatic rings include those in which some or all of the hydrogen atoms are substituted with a protonic acid group, —$C_mH_{2m+1}$ (m represents an integer of from 1 to 10), —Cl, —F, —$CF_3$ or —CN.

Examples of the linking group include a direct bond, —CO—, —$SO_2$—, —S—, —$CH_2$—, —$CF_2$—, —$C(CH_3)_2$—, —$C(CF_3)_2$—, —O—, —NH—CO—, —CO—O—, —O—CO—O—, a 9,9-fluorene group and the like.

Examples of the compound having a repeating structural unit of the divalent aromatic group include an aromatic polyether, an aromatic polysulfide, an aromatic polyamide, an aromatic polyimide, an aromatic polyazole, an aromatic polyester, an aromatic polycarbonate, an aromatic polyarylene and the like. Among these compounds, preferred is an aromatic polyether because it is excellent in solvent solubility, and is easily processed into a film or the like. Here, examples of the aromatic polyether in the present invention not only include an aromatic polyether comprising only an ether group as a linking group of the aromatic ring, such as polyphenylene oxide, but also include polyether ketone comprising an ether group and a carbonyl group as a linking group, polyether sulfone comprising an ether group and a sulfonic group as a linking group, polysulfone, polyether nitrile and polyether pyridine.

The divalent aromatic group that contains a protonic acid group according to the present invention has an aromatic hydrocarbon type compound unit that contains a protonic acid group. The aromatic hydrocarbon type compound unit that contains a protonic acid group has a structure including one or more aromatic rings, wherein the aromatic rings may be condensed with one or more aromatic rings or heterocyclic rings. Further, some of the carbon atoms in the aromatic ring may be substituted with other atoms.

Concrete examples of the protonic acid group according to the present invention include a sulfonic acid group, a carboxylic acid group, a phosphonic acid group, represented by the following formulae (3) to (5), and the like. Among these, preferred is a sulfonic acid group represented by the following formula (3).

$$—C_nH_{2n}—SO_3H \text{ (n is an integer of from 0 to 10)} \quad (3)$$

$$—C_nH_{2n}—COOH \text{ (n is an integer of from 0 to 10)} \quad (4)$$

$$—C_nH_{2n}—PO_3H_2 \text{ (n is an integer of from 0 to 10)} \quad (5)$$

The block copolymer contained in the binder for a fuel cell according to the present invention has a glass transition temperature of 180° C. or less, preferably in the range of 100 to 180° C. and more preferably in the range of 120 to 160° C. When the glass transition temperature is higher than 180° C., a protonic acid group may detach from the aromatic ring because the block copolymer needs to be thermally fusion-bonded at a temperature higher than the glass transition temperature, when molded into a fuel cell; therefore, such a temperature is not preferable in some cases. When the glass transition temperature is lower than 100° C., and the copolymer is used in the fuel cell, cell properties might deteriorate due to drop in adhesion during operation, since operation temperature for a hydrogen type fuel cell (PEFC) is about 80° C. Meanwhile, the glass transition temperature is a value measured by raising the temperature up to 300° C. from room temperature at a rate of 10° C./min using a differential scanning calorimeter. It is possible that the block copolymer of the present invention has a glass transition temperature of 180° C. or less when both of the block having a repeating structural unit of a divalent aromatic group that contains a protonic acid group and the block having a repeating structural unit of a divalent aromatic group that does not contain a protonic acid group have glass transition temperatures of 180° C. or less, but it is also possible when either of the blocks has a glass transition temperature of 180° C. or less.

The aforementioned block copolymer is composed of an alkali metal salt of the protonic acid group immediately after the synthesis, and is usually Na type. When it is used for a binder or the like, the alkali metal ion is substituted with a hydrogen ion to convert into H type (free sulfonic acid group). To convert the block copolymer into H type, it is usually immersed in an aqueous 2N sulfuric acid solution and pure water for one day each, respectively. Since the glass transition temperature of the block copolymer of the present invention is the same, regardless whether the block copolymer is Na type or H type, it is sufficient to measure the glass transition temperature of either one of the two types.

The block copolymer preferably is a linear aromatic resin with no aliphatic chain in the main chain and composed of aromatic rings and linking groups thereof, and a part of structural unit of the block copolymer is a polymer having a protonic acid group.

Furthermore, the block copolymer being composed of an aromatic polyether structure is preferable since the block copolymer does not have a linking group susceptible to hydrolysis by hot water, an acid, an alkali, alcohols or the like, or a group with low heat resistance and low resistance to radicals, therefore deterioration or modification hardly occurs when it is used as a material for a fuel cell. When the block copolymer has an ester bond, a carbonate bond, an amide bond, an imide bond, an α hydrogen-containing alkylene bond having low heat resistance and being susceptible to radical attacks, an aliphatic ether bond or the like, it tends to be unfavorable since the block copolymer becomes susceptible to hydrolysis by hot water, an acid, an alkali, alcohols or the like, resulting in deterioration of a fuel cell.

The ion exchange group equivalent of the block copolymer according to the present invention is preferably from 200 to 1,000 g/mole, and more preferably from 250 to 600 g/mole. To measure the ion exchange group equivalent, the block copolymer is usually formed into a film on a substrate by casting or the like. When the protonic acid group of the block copolymer is Na type, the block copolymer may be formed into a film and then converted into H type for measurement.

Here, the ion exchange group equivalent is defined as the weight of a resin per 1 mole of the protonic acid group and which means a reciprocal number of the protonic acid group moles per unit weight of a resin. Namely, a smaller ion exchange group equivalent indicates a greater proportion of the blocks having a repeating structural unit of a divalent aromatic group that contains a protonic acid group in the block copolymer, and a greater ion exchange group equivalent indicates a smaller proportion of the blocks having a repeating structural unit of a divalent aromatic group that contains a protonic acid group. When the ion exchange group equivalent is too small, the proportion of the blocks having a repeating structural unit of a divalent aromatic group that does not contain a protonic acid group is too low. Therefore, water resistance of the block copolymer may become insufficient, water absorption may become high, and detachment of an electrode from a polymer electrolyte may easily occur in some cases. When the ion exchange group equivalent is too great, the proportion of the blocks having a repeating structural unit of a divalent aromatic group that contains a protonic acid group is too low. Therefore, sufficient proton conductivity may not be obtained in some cases.

The block copolymer according to the present invention preferably has a weight retention ratio of 90% or more, and more preferably 95% or more, as measured by immersion in a 64 weight % aqueous methanol solution at 25° C. for 24 hours. Here, the weight retention ratio as measured by immersion in a 64 weight % aqueous methanol solution can be calculated from the weight loss of the block copolymer after immersing the dried block copolymer in a 64 weight % aqueous methanol solution at 25° C. for 24 hours. Measurement of the weight retention ratio is usually conducted by forming the block copolymer into a film on a substrate by casting or the like. When the protonic acid group of the block copolymer is Na type, the block copolymer is converted into H type for measurement after having been formed into a film. When the weight retention ratio as measured by immersion in methanol is low, it tends to be unfavorable since the binder for a fuel cell containing the block copolymer is easily dissolved in methanol and cannot maintain adhesion.

The divalent aromatic group that contains a protonic acid group according to the present invention is preferably represented by the following general formula (1), while the divalent aromatic group that does not contain a protonic acid group is preferably represented by the following general formula (2), wherein, in the general formulae (1) and (2), $X^1$ to $X^5$ each independently represent a hydrogen atom or a protonic acid group; at least one of $X^1$ to $X^5$ is a protonic acid group; $A^1$ to $A^4$ each independently represent a direct bond, —$CH_2$—, —$C(CH_3)_2$—, —$C(CF_3)_2$—, —O—, —$SO_2$— or —CO—; g, h, i, j, k and l each independently represent 0 or 1; and a hydrogen atom of an aromatic ring may be substituted with —$C_mH_{2m+1}$ (m represents an integer of from 1 to 10), —Cl, —F, —$CF_3$ or —CN.

In the present invention, the glass transition temperature of the block copolymer comprising the block having the repeating structural unit of the general formula (1) and the block having the repeating structural unit of the general formula (2) is 180° C. or less. The glass transition temperature of the block copolymer of 180° C. or less may be obtained when the glass transition temperatures of both of the block having the repeating structural unit of the above general formula (1) and the block having the repeating structural unit of the general formula (2) are 180° C. or less, however, such a glass transition temperature of 180° C. or less may also be obtained when the glass transition temperature of either one of the two blocks is 180° C. or less. For example, although the glass transition temperature of the block comprising the repeating structural unit represented by the general formula (1) tends to be greater than 180° C., if the block comprising the repeating structural unit represented by the general formula (2) is properly selected, the glass transition temperature of the aromatic hydrocarbon type compound can be 180° C. or less. In order to do so, the blocks comprising repeating structural units represented by the general formula (2) is required to have the glass transition temperature of 180° C. or less so that the copolymerized aromatic hydrocarbon type compound has the glass transition temperature of 180° C. or less. Here, the glass transition temperature indicates a value measured by raising the temperature up to 300° C. from room temperature at a rate of 10° C./min using a differential scanning calorimeter, and the glass transition temperature of the block portion refers to a glass transition temperature of an oligomer that forms the block.

In the block copolymer according to the present invention, it is preferable that the block having the repeating structural unit of the general formula (1) is hydrophilic and the block having the repeating structural unit of the general formula (2) is hydrophobic.

It is preferable that the block has the repeating structural unit of the general formula (2) since the structure thereof is low in water absorption, hardly susceptible to hydrolysis, thus capable of suppressing dissolution of a proton conductive copolymer in water or its swelling due to water absorption. Here, the block may have two or more kinds of the repeating structural unit represented by the general formula (2). It tends to be undesirable to contain an ester bond, a carbonate bond, an amide bond, an imide bond or a protonic acid group in the block having the repeating structural unit of the general formula (2), since the block may become susceptible to hydrolysis or swelling due to water absorption, and solubility of the copolymer into water and water absorption may become high.

Further, in the general formula (1), it is particularly preferable that $X^1$ and $X^2$ are protonic acid groups, $A^1$ is —$SO_2$— or —CO—, and g is 1, since the protonic acid group of the block copolymer is bonded to an aromatic ring bonded directly to an electron withdrawing group, i.e., —$SO_2$— or —CO—, thus having a stronger bonding strength than a protonic acid group bonded to other aromatic rings, and therefore the protonic acid group is not susceptible to decomposition or dissociation.

Furthermore, in the general formula (2), it is particularly preferable that $A^3$ is —$SO_2$— or —CO—, or that a part of the hydrogen atom bonded to an aromatic ring is substituted with —$C_mH_{2m+1}$ (m is an integer of from 1 to 10), —Cl, —F, —$CF_3$ or —CN.

The molecular weight of the block copolymer according to the present invention is not particularly limited, but the reduction viscosity (concentration: 0.5 g/dl, measured at 35° C.) is preferably in the range of 0.4 to 3.0 dl/g and particularly preferably in the range of 0.6 to 2.5 dl/g. When the molecular weight is too low, the strength may become low when the block copolymer is used as a binder for a fuel cell, and sufficient adhesion may not be obtained in some cases. When the molecular weight is too high, the melt flow may become insufficient and sufficient adhesion may not be obtained in some cases.

In the structure of the general formula (2), it is preferable that j is 1 and k is 0, since methanol resistance is high and synthesis is easy. In particular, when j is 1, k is 0 and $A^3$ is —CO—, such a structure is particularly preferable because methanol resistance is excellent, the glass transition temperature is low, and adhesion is high.

The block copolymer comprising the blocks having repeating structural units of the general formulae (1) and (2) according to the present invention can be obtained, for example, by polymerizing an aromatic dihalide compound, an aromatic dihydroxy compound and these compounds having a protonic acid group. Typical concrete examples of the monomers are as follows.

Examples of the aromatic dihalide compound include 4,4'-difluorobenzophenone, 3,3'-difluorobenzophenone, 4,4'-dichlorobenzophenone, 3,3'-dichlorobenzophenone, 4,4'-difluorodiphenylsulfone, 4,4'-dichlorodiphenylsulfone, 1,4-difluorobenzene, 1,3-difluorobenzene, 2,6-dichlorobenzonitrile, 4,4'-difluorobiphenyl, 3,3'-dibromo-4,4'-difluorobiphenyl, 4,4'-difluorodiphenylmethane, 4,4'-dichlorodiphenylmethane, 4,4'-difluorodiphenylether, 2,2-bis(4-fluorophenyl)propane, 2,2-bis(4-chlorophenyl)propane, α,α'-bis(4-fluorophenyl)-1,4-diisopropylbenzene, 3,3'-dimethyl-4,4'-difluorobenzophenone, 3,3'-diethyl-4,4'-difluorobenzophenone, 3,3',5,5'-tetramethyl-4,4'-difluorobenzophenone, 3,3'-dimethyl-4,4'-dichlorobenzophenone, 3,3',4,4'-tetramethyl-5,5'-dichlorobenzophenone, 3,3'-dimethyl-4,4'-difluorodiphenylsulfone, 3,3'-dimethyl-4,4'-dichlorodiphenylsulfone, 2,5-difluorotoluene, 2,5-difluoroethylbenzene, 2,5-difluoro-p-xylene, perfluorobenzene and the like. These can be used singly or in combination of two or more kinds.

Examples of the aromatic dihydroxy compound include hydroquinone, resorcin, catechol, 4,4'-dihydroxybiphenyl, 4,4'-dihydroxydiphenylsulfide, 4,4'-dihydroxydiphenylmethane, 4,4'-dihydroxydiphenylether, 4,4'-dihydroxydiphenylsulfone, 4,4'-dihydroxybenzophenone, 2,2'-bis(4-hydroxyphenyl)propane, 1,1,1,3,3,3-hexafluoro-2,2-bis(4-hydroxyphenyl)propane, 1,4-bis(4-hydroxyphenyl)benzene, α,α'-bis(4-hydroxyphenyl)-1,4-dimethylbenzene, α,α'-bis(4-hydroxyphenyl)-1,4-diisopropylbenzene, α,α'-bis(4-hydroxyphenyl)-1,3-diisopropylbenzene, 4,4'-dihydroxybenzophenone, 1,4-bis(4-hydroxybenzoyl)benzene, 3,3-difluoro-4,4'-dihydroxybiphenyl, 2-methylhydroquinone, 2-ethylhydroquinone, 2-isopropylhydroquinone, 2-octylhydroquinone, 2,3-dimethylhydroquinone, 2,3-diethylhydroquinone, 2,5-dimethylhydroquinone, 2,5-diethylhydroquinone, 2,5-diisopropylhydroquinone, 2,6-dimethylhydroquinone, 2,3,5-trimethylhydroquinone, 2,3,5,6-tetramethylhydroquinone, 3,3'-dimethyl-4,4'-dihydroxybiphenyl, 3,3',5,5'-tetramethyl-4,4'-dihydroxybiphenyl, 3,3'-dimethyl-4,4'-dihydroxydiphenylmethane, 3,3',5,5'-tetramethyl-4,4'-dihydroxydiphenylmethane, 3,3',5,5'-tetraethyl-4,4'-dihydroxydiphenylmethane, 3,3'-dimethyl-4,4'-dihydroxydiphenyl ether, 3,3',5,5'-tetramethyl-4,4'-dihydroxydiphenyl ether, 3,3'-dimethyl-4,4'-dihydroxydiphenylsulfide, 3,3',5,5'-tetramethyl-4,4'-dihydroxydiphenylsulfide, 3,3'-dimethyl-4,4'-dihydroxydiphenylsulfone, 3,3',5,5'-tetramethyl-4,4'-dihydroxydiphenylsulfone, 2,2-bis(3-methyl-4-hydroxyphenyl)propane, 2,2-bis(3-ethyl-4-hydroxyphenyl)propane, 2,2-bis(3,5-dimethyl-4-hydroxyphenyl)propane, α,α'-bis(3-methyl-4-hydroxyphenyl)-1,4-diisopropylbenzene, α,α'-bis(3,5-dimethyl-4-hydroxyphenyl)-1,4-diisopropylbenzene, α,α'-bis(3-methyl-4-hydroxyphenyl)-1,3-diisopropylbenzene, α,α'-bis(3,5-dimethyl-4-hydroxyphenyl)-1,3-diisopropylbenzene and the like. These can be used singly or in combination of two or more kinds.

Examples of the aromatic dihalide compound having a protonic acid group include 2,5-dichlorobenzoic acid, 2,5-difluorobenzoic acid, 5,5'-carbonylbis(2-fluorobenzoic acid), 5,5'-sulfonylbis(2-fluorobenzoic acid), 2,5-dichlorophenylphosphoric acid, 5,5'-carbonylbis(2-fluorobenzenephosphoric acid), an alkali metal salt thereof and the like, in addition to sulfides and alkyl sulfides of the above aromatic halide compound.

Examples of the aromatic dihydroxy compound having a protonic acid group include aromatic dihydroxy compounds having a phosphoric acid such as 2,5-dihydroxybenzoic acid, 2,5-dihydroxyterephthalic acid, 5,5'-methylenedisalicylic acid, 5,5'-thiodisalicylic acid, 2,5-dihydroxyphenylphosphoric acid and the like, and alkali metal salts thereof, in addition to sulfides and alkyl sulfides of the above aromatic dihydroxy compound.

Sulfides and alkyl sulfides of the aromatic dihalide compound and the aromatic dihydroxy compound can be obtained by a method such as sulfonating the aromatic dihalide compound and the aromatic dihydroxy compound using a known sulfonating agent such as a fuming sulfuric acid (Macromol. Chem., Phys., Vol. 199, p. 1421 (1998)).

Examples of the repeating structural unit of the aromatic group that contains a protonic acid group represented by the general formula (1) and which forms a hydrophilic block are as follows.

Examples of the repeating structural unit of the aromatic group that does not contain a protonic acid group represented by the general formula (2) and which forms a hydrophobic block are as follows.

Method for Producing a Block Copolymer

The method for producing the block copolymer of the present invention is not particularly limited, but the block copolymer can be synthesized, for example, by known methods as described below.

(A) An oligomer having a repeating structural unit of the general formula (1) is obtained by subjecting a monomer having a protonic acid group and a monomer having no protonic acid group or having a protonic acid group to condensation polymerization. Then, the oligomer and an oligomer having a repeating structural unit of the general formula (2) or a raw material monomer thereof are subjected to condensation polymerization to obtain a block copolymer.

(B) An oligomer having a repeating structural unit of the general formula (2) is obtained by subjecting a monomer having no protonic acid group to condensation polymerization. Then, the oligomer and an oligomer having a structural unit of the general formula (1) or a raw material monomer thereof are subjected to condensation polymerization to obtain a block copolymer.

(C) An oligomer having a repeating structural unit of the general formula (1) is obtained by subjecting a monomer having no protonic acid group to condensation polymerization to form a precursor oligomer, and introducing a protonic acid group into the precursor oligomer by a method such as sulfonation. Then, the oligomer and a monomer having no protonic acid group or an oligomer thereof are subjected to condensation polymerization to obtain a block copolymer.

(D) A precursor block copolymer is synthesized, wherein the precursor block copolymer comprises a block having a structural unit into which a protonic acid group is easily introduced, and a blocks having a structural unit of the general formula (2) into which a protonic acid group is hardly introduced. Then, a block having a repeating structural unit of the general formula (1) is formed by introducing a protonic acid group only into the block having a structural unit into which a protonic acid group is easily introduced, by a method such as sulfonation, thereby obtaining a block copolymer.

The above-described method (A) is preferable as a method for producing the block copolymer of the present invention, since it is easy to control the ion exchange group equivalent of the block copolymer. In particular, a method of subjecting a monomer having a protonic acid group to condensation polymerization to obtain an oligomer having a repeating structural unit of the general formula (1), and allowing this oligomer to react with a monomer or an oligomer having no protonic acid group is preferable since it is easy to control the block copolymer having a protonic acid group.

Specifically, in the method for producing the block copolymer of the present invention, an oligomer that contains a protonic acid group and which has a repeating structural unit of the general formula (1) is synthesized by polymerizing an aromatic dihalide compound having a protonic acid group and an aromatic dihydroxy compound; an aromatic dihalide compound and an aromatic dihydroxy compound having a protonic acid group; or an aromatic dihalide compound having a protonic acid group and an aromatic dihydroxy compound having a protonic acid group. The obtained oligomer preferably has a reduction viscosity of 0.05 to 1.2 dl/g at 35° C. The molecular weight of the oligomer can be controlled by a general method such as controlling a reaction time, reaction temperature, preparation ratio of the aromatic dihalide compound and aromatic dihydroxy compound, or the like.

To the above oligomer, an aromatic dihalide compound and an aromatic dihydroxy compound are added and the mixture is subjected to polycondensation to form a block having a repeating structural unit of the general formula (2), then a block copolymer is obtained. Alternatively, by adding to the above oligomer an oligomer having a repeating structural unit of the general formula (2), which has separately been obtained by subjecting an aromatic dihalide compound and an aromatic dihydroxy compound to polycondensation, then subjecting to polycondensation to obtain a block copolymer.

Whether the obtained block copolymer is block bonded or random bonded can be determined by, for example, a method of calculating the number of repeating units in the block by NMR measurement as described in Japanese Patent Laid-open No. 2001-278978, a method of observing the existence of a micro-phase separation structure that is peculiar to the block copolymer by a transmissive electron microscope as described in Japanese Patent Laid-open No. 2003-31232 or the like.

In the block copolymer according to the present invention, the protonic acid group may become Na type during polymerization of the aforementioned oligomer, block copolymer, or the like. In this case, the block copolymer is converted into H type, prior to use. To convert the block copolymer into H type, the block copolymer is usually immersed in an aqueous 2N sulfuric acid solution and pure water for one day each to carry out proton exchange of a protonic acid salt.

Binder for a Fuel Cell

The binder for a fuel cell of the present invention contains a block copolymer having a protonic acid group having a glass transition temperature (Tg) of 180° C. or less.

The form the binder for a fuel cell of the present invention may take is not particularly limited, and that may be powder, a varnish dissolved or dispersed in a solvent, a membrane obtained by coating or drying the varnish or the like, depending on usage. Further, when the block copolymer is dissolved or dispersed in a solvent to obtain a varnish, the solvent is not particularly limited and examples thereof include water; alcohols such as methanol, ethanol, 1-propanol, 2-propanol, butanol, methoxy ethanol and the like; hydrocarbons such as toluene, xylene and the like; halogenated hydrocarbons such as methyl chloride, methylene chloride and the like; ethers such as dichloroethyl ether, 1,2-dimethoxyethane, 1,4-dioxane, tetrahydrofuran and the like; fatty acid esters such as methyl acetate, ethyl acetate and the like; ketones such as acetone, methyl ethyl ketone and the like; and non-protonic polar solvents such as N,N-dimethylformamide, N,N-dimethylacetamide, N-methyl-2-pyrrolidone, dimethyl sulfoxide, dimethyl carbonate and the like. These can be used singly or in combination thereof.

In the binder for a fuel cell of the present invention, other known ion conductive polymer materials can be used in combination with the block copolymer according to the present invention. For example, a fluorinated polymer that contains a protonic acid group or a conventionally known hydrocarbon type polymer that contains a protonic acid group can be used.

In this case, the combination ratio of the block copolymer according to the present invention in the binder for a fuel cell is preferably from 5 to 95 weight % and more preferably from 10 to 90 weight %. When the mixed amount of the block copolymer is small, adhesion between an electrode material and a polymer electrolyte may be lowered.

Adhesion of the binder for a fuel cell of the present invention may be evaluated as follows. A binder for a fuel cell in the form of a varnish is applied onto both of a polymer electrolyte membrane comprising a hydrocarbon type compound that contains a protonic acid group and an electrode sheet, and dried. Then, the resulting material is thermally pressed at a predetermined temperature to prepare an assembly of the polymer electrolyte membrane and the electrode. The assembly is subjected to T-type peeling using a tensile tester to measure the average peeling strength. T-type peeling is carried out when the assembly is in a dried condition or after immersing the assembly in distilled water or an aqueous methanol solution for a predetermined time.

Composition for Forming a Fuel Cell Electrode

The composition for forming a fuel cell electrode of the present invention contains the aforementioned binder for a fuel cell and an electrode material. By containing the binder for a fuel cell in the composition for forming a fuel cell electrode, peeling strength can be enhanced. As needed, various other ion conductive polymer compounds may further be mixed in.

Examples of the above electrode material include a conductive material having electric conductivity, a catalyst that promotes oxidation of hydrogen and reduction of oxygen, and the like.

As the conductive material, any material may be used as far as it has electric conductivity and examples thereof include various metals, carbon materials and the like. The conductive material is at least one kind selected from a group consisting of carbon blacks such as acetylene black or the like, an activated carbon, graphite, lead, iron, manganese, cobalt, chrome, gallium, vanadium, tungsten, ruthenium, iridium, palladium, platinum, rhodium or alloys thereof. These are used singly or in combination, in the form of powder or sheet.

The above catalyst is not particularly limited as far as it is a metal or a metal oxide that promotes oxidation of hydrogen and reduction of oxygen. Examples thereof include lead, iron, manganese, cobalt, chrome, gallium, vanadium, tungsten, ruthenium, iridium, palladium, platinum, rhodium or alloys thereof, or metal oxides such as molybdenum oxide and the like.

The combination ratio of the electrode material and the binder for a fuel cell is not particularly restricted, however the proportion of the binder for a fuel cell is preferably from 5 to 90 weight %, within which strength and efficiency of an electrode can be achieved at the same time.

Electrode for a Fuel Cell

The electrode for a fuel cell according to the present invention comprises a layer of a current collecting material and a layer of the aforementioned composition for forming a fuel cell electrode that are bonded to each other, wherein the layer of the composition for forming a fuel cell electrode is in contact with an electrolyte membrane. Various materials qualify for the current collecting material, but carbon paper is preferably used.

The electrode for a fuel cell according to the present invention can be obtained by various methods, but usually preferred is a method of applying a solution of the composition for forming a fuel cell electrode onto the current collecting material and drying, from the viewpoint of easily obtaining the electrode.

Fuel Cell

The fuel cell of the present invention may be a hydrogen type fuel cell (PEFC) or a direct methanol type fuel cell (DMFC), but preferred is a direct methanol type fuel cell. The fuel cell of the present invention is composed of an electrolyte membrane, the aforementioned binder for a fuel cell and the electrode for a fuel cell, wherein the binder for a fuel cell is disposed in between the electrolyte membrane and each of the positive and negative electrodes. Various known electrolyte membranes can be used for the electrolyte membrane used for the fuel cell according to the present invention, but preferred is a polymer compound, which preferably contains a hydrocarbon type polymer compound that contains a protonic acid group with no fluorine atom, since peeling strength against the electrode can be strong. In the fuel cell of the present invention, detachment does not occur at an interface between the membrane and the electrode or an interface between the catalyst and the binder, even when the proton conductive material repeats swelling and shrinking due to fluctuation in humidity or temperature, thus the output is hardly lowered. Since the fuel cell of the present invention comprises a binder having a glass transition temperature of 180° C. or less, a protonic acid group does not detach at the time of adhering the electrolyte membrane and the electrode. For that reason, the fuel cell of the present invention is highly efficient and excellent in reliability.

EXAMPLES

The present invention is now more specifically illustrated with reference to Examples. However, the present invention is not restricted to these Examples.

Methods of the tests conducted in Examples are as follows:

(i) Reduction Viscosity (ηinh)

After dissolving 0.50 g of a block copolymer in 100 ml of N-methylpyrrolidone while heating, the reduction viscosity was measured at 35° C. using an Ubbelohde viscometer.

(ii) Ion Exchange Group Equivalent

The binder for a fuel cell prepared in the form of a film was accurately measured and put in a glass vessel which can be tightly sealed. An aqueous calcium chloride solution of an excessive amount was added thereto and the resulting material was stirred overnight. Hydrogen chloride generated in the system was calculated by titrating with a standard 0.1N sodium hydroxide aqueous solution using a phenolphthalein indicator.

(iii) Weight Retention Ratio as Measured by Immersion in a 64 Weight % Aqueous Methanol Solution The binder for a fuel cell prepared in the form of a film was dried at 120° C. for 12 hours in a nitrogen flow, immersed in a 64 weight % aqueous methanol solution at 25° C. for 24 hours. The weight retention ratio was calculated from the change in weight compared with that in a dried condition.

(iv) Ion Conductivity (25° C., in the Direction of Membrane Thickness)

The binder for a fuel cell prepared in the form of a film was humidified with 1M sulfuric acid, and sandwiched between two cells for measurement each comprising a polyethylene terephthalate film in a thickness of 100 μm with a bore of 1 cm$^2$ and a platinum electrode attached on one surface of the film. The vacant bore was filled with 1M sulfuric acid water. This sample was placed in a thermostatic chamber at 25° C. and resistance thereof was measured. The resistance of the binder itself was calculated from the difference in the above resistance and the resistance when no binder was sandwiched therebetween, and ion conductivity (at 25° C., in the direction of membrane thickness) was calculated. The membrane thickness necessary for calculating the ion conductivity was measured in a dried condition, using a micrometer.

(v) Methanol Permeability

Distilled water and 1 mol/L of an aqueous methanol solution were brought into contact with each other via a binder for a fuel cell prepared in the form of a film having a diameter of 23 mmϕ, at room temperature, and the change in methanol concentration in the distilled water side for up to 3 hours was measured by gas chromatography. From the slope of the obtained line indicating increase in methanol concentration, methanol permeability at a membrane thickness of 50 μm was calculated.

(vi) Glass Transition Temperature (Tg)

A block copolymer or an oligomer was measured at a temperature elevation rate of 10° C./min using a differential scanning calorimetry (DSC, a product of Shimadzu Corporation, DSC-60A).

When a protonic acid group of a block copolymer was sodium sulfonate, the sample was heated up to 250° C., then quickly cooled down to room temperature, and subsequently heated up to 300° C. from room temperature to measure the glass transition temperature. When the protonic acid group of the block copolymer was a free sulfonic acid group, the sample was heated up to 170° C., kept at 170° C. for 10 minutes, then quickly cooled down to room temperature, and subsequently heated up to 200° C. to measure the glass transition temperature.

(vii) Evaluation of Adhesion

A binder for a fuel cell in the form of a varnish in which a block copolymer was dissolved was coated on both of a polymer electrolyte membrane comprising a hydrocarbon type compound that contains a protonic acid group and an electrode sheet. The resulting material was dried, then thermally pressed for 8 minutes at 1 MPa and a glass transition temperature of +20° C. of a copolymer for a fuel cell, and an assembly of the polymer electrolyte membrane and the electrode was prepared. The obtained assembly of the polymer electrolyte membrane and the electrode was immersed in distilled water for 10 minutes, then the average peeling strength was measured by carrying out a T-type peeling test using a tensile tester at a peeling strength of 10 mm/min.

Preparation of a Polymer Electrolyte Membrane 4.22 g (0.01 mole) of 3,3'-carbonylbis(sodium 6-fluorobenzenesulfonate) (hereinafter simply referred to as DSDFBP), 2.18 g of 4,4'-difluorobenzophenone (hereinafter simply referred to as DFBP), 5.69 g (0.02 mole) of 2,2'-bis (3,5-dimethyl-4-hydroxyphenyl)propane and 3.46 g (0.025 mole) of anhydrous potassium carbonate were accurately measured and put in. a flask having a nitrogen inlet tube, a thermometer, a separator-equipped condenser and a stirrer. 40 g of dimethylsulfoxide and 28 g of toluene were added thereto, and a nitrogen gas was allowed to pass through the resulting material while being stirred and heated up to 130° C., then an azeotropic dehydration was carried out for 2 hours to remove generated water, followed by removal of toluene by distillation.

Subsequently, the material was allowed to react for 14 hours at 160° C. to obtain a viscous polymer solution. To the obtained solution was added 60 g of dimethylsulfoxide for dilution, followed by filtration. This polymer solution was discharged into 600 g of acetone, and after filtering precipitated polymer powder, dried at 160° C. for 4 hours to obtain 10.39 g (Yield: 92%) of polymer powder. The logarithmic viscosity of the obtained polyether ketone was 0.85 dl/g, while the glass transition temperature was 230° C.

The obtained polymer powder was dissolved in dimethylsulfoxide and cast onto a glass substrate. The resulting material was dried at 200° C. for 4 hours to obtain a polyether ketone film containing a sodium sulfonate group. The resulting film was highly flexible and strong. This film was irradiated with light of 6,000 mJ/cm$^2$ using a metal halide lamp and allowed to crosslink. Subsequently, the crosslinked film was immersed in an aqueous 2N sulfuric acid solution and pure water for one day, respectively, for carrying out proton exchange in the sodium sulfonate group to obtain a polymer electrolyte membrane comprising a polyether ketone-crosslinked body that contains a sulfonic acid group having a free sulfonic acid group.

Example 1

1. Synthesis of an Oligomer of Blocks Having a Repeating Structural Unit of a Divalent Aromatic Group that Contains a Protonic Acid Group 14.36 g (0.034 mole) of DSDFBP, 10.25 g (0.04 mole) of 4,4'-methylenebis(2,6-dimethylphenol) (hereinafter simply referred to as TMBPF) and 5.30 g (0.05 mole) of anhydrous sodium carbonate were accurately measured and put in a flask having a nitrogen inlet tube, a thermometer, a separator-equipped condenser and a stirrer. 98 g of N-methylpyrrolidone (hereinafter simply referred to as NMP) was added thereto, and the resulting material was heated up to 202° C. while allowing a nitrogen gas to pass through and stirred, then allowed to react for 8 hours. After cooling, the reactant was partially sampled. The sample was diluted with NMP and the supernatant was discharged into acetone to allow an oligomer to precipitate, then washed with acetone, and dried at 150° C. for 4 hours under nitrogen flow to obtain an oligomer. The reduction viscosity of the obtained oligomer was 0.27 dl/g (NMP).

2. Synthesis of a Block Copolymer

To the above oligomer were added 13.78 g (0.063 mole) of DFBP, 6.29 g (0.057 mole) of resorcin, 7.57 g (0.07 mole) of anhydrous sodium carbonate and 80 g of NMP. The resulting mixture was heated up to 202° C. while allowing a nitrogen gas to pass through and stirred, and then allowed to react for 6 hours.

The obtained viscous reactant was diluted with 50 g of NMP and then discharged into 2 L of acetone. The precipitated polymer was filtered and collected, washed with acetone and distilled water, and after drying at 50° C. for 8 hours, the polymer was further dried at 110° C. for 4 hours to obtain 36.0 g (Yield: 85%) of a block copolymer having an alkali metal salt group (sodium sulfonate group) of a protonic acid group. The reduction viscosity of the obtained block copolymer was 1.29 dl/g, while the glass transition temperature was 122° C.

3. Molding of a Film 2 g of the obtained block copolymer was dissolved in 13.3 g of NMP and heated to obtain a varnish having a polymer concentration of 15%. The obtained varnish was cast onto a glass substrate using a blade having a spacer, and the resulting material was heated up to 200° C ade. from room temperature over 2 hours under nitrogen flow, and further dried for 4 hours to obtain a film having a thickness of 50 μm.

The resulting film was immersed in an aqueous 2N sulfuric acid solution and pure water for one day, respectively, for carrying out proton exchange in a sodium sulfonate group to obtain a film of a binder for a fuel cell having a free sulfonic acid group. The ion exchange group equivalent of the film of a proton conductive binder for a fuel cell was 570 g/mole, the weight retention ratio as measured by immersion in a 64 weight % aqueous methanol solution was 98%, the ion conductivity was 0.037 S/cm, and the methanol permeability was 4.8 μmole/cm²·min.

4. Preparation of a Varnish

The obtained block copolymer polymer powder was immersed in an aqueous 2N sulfuric acid solution and pure water for one day, respectively, for carrying out proton exchange in a sodium sulfonate group to obtain powder of a polymer having a free sulfonic acid group. The glass transition temperature of the obtained block copolymer having the obtained free sulfonic acid group was 121° C. 2 g of the block copolymer that had been subjected to proton exchange was dissolved in 38 g of a solution comprising 25 weight % of water and 75 weight % of 1,2-dimethoxyethane, then heated to obtain a varnish of a proton conductive binder for a fuel cell having a polymer concentration of 5%. With this varnish, the above polymer electrolyte membrane and a commercial electrode (a product of ElectroChem, Inc., EC-20-10-7) were adhered. The measured average peeling strength thereof was 11.6 N/m.

5. Glass Transition Temperatures of Two Kinds of Blocks Constituting a Block Copolymer The glass transition temperatures of "a block having a repeating structural unit of a divalent aromatic group that contains a protonic acid group" and "a block having a repeating structural unit of a divalent aromatic group that does not contain a protonic acid group", that constitute a block copolymer, were obtained by preparing each of the blocks in a form of an oligomer or a polymer.

The glass transition temperature of the oligomer of "a block having a repeating structural unit of a divalent aromatic group that contains a protonic acid group" obtained in the above item 1 was not observed within the range of the measurement.

The glass transition temperature of the oligomer of "a block having a repeating structural unit of a divalent aromatic group that does not contain a protonic acid group" was measured in accordance with the following manner.

21.82 g (0.10 mole) of DFBP, 10.57 g (0.096 mole) of resorcin and 11.02 g (0.104 mole) of anhydrous sodium carbonate were accurately measured and put in a flask having a nitrogen inlet tube, a thermometer, a separator-equipped condenser and a stirrer. 86.5 g of N-methyl-2-pyrrolidone and 1.8 g of pure water were added thereto, and the resulting material was heated up to 200° C. over 2 hours while being stirred and allowing a nitrogen gas to pass through, then allowed to react for 6 hours. Water distilled out from the flask at this time was recovered by a separator. The obtained viscous reaction mass was cooled, diluted with 80 g of N-methyl-2-pyrrolidone, and then filtered with the aid of Celite to remove the by-product salt. This polymer solution was discharged into 500 ml of a mixed solution of water and methanol (5/5, weight/weight), then the precipitated polymer was filtered and collected, and after washing with a 5 weight % aqueous hydrochloric acid solution, pure water and methanol, the polymer was dried at 100° C. for 4 hours to obtain 25.8 g (Yield: 90%) of polyaryl ether ketone powder comprising the same repeating structural units as the block having no sulfonic acid group of Example 1.

The reduction viscosity of the obtained polyaryl ether ketone powder was 0.56 dl/g (solvent: mixed solution of p-chlorophenol and phenol (9/1, weight/weight)), while the glass transition temperature was 118° C.

From the above, it is obvious that the glass transition temperature of the block copolymer obtained in Example 1 derives from the block having a repeating structural unit of a divalent aromatic group that does not contain a sulfonic acid group.

Example 2

A block copolymer having a sodium sulfonate group was obtained in the same manner as in Example 1 except that 13.01 g of 2,2'-bis(4-hydroxyphenyl)propane was used instead of resorcin. The reduction viscosity of the block copolymer was 1.40 dl/g (NMP), while the glass transition temperature was 155° C.

Using the obtained block copolymer, a film of a binder for a fuel cell having a free sulfonic acid group was obtained in the same manner as in Example 1. The ion exchange group equivalent of the obtained film of the binder for a fuel cell was 590 g/mole, the weight retention ratio as measured by immersion in a 64 weight % aqueous methanol solution was 96%, the ion conductivity was 0.036 S/cm, and the methanol permeability was 4.9 $\mu mole/cm^2 \cdot min$.

Meanwhile, using the obtained block copolymer, powder of a polymer having a free sulfonic acid group was obtained in the same manner as in Example 1. The glass transition temperature of the obtained block copolymer having a free sulfonic acid group was 155° C. Using a varnish obtained by dissolving this polymer in the same manner as in Example 1, a crosslinked membrane of polyether ketone containing a sulfonic acid group and a commercially available electrode (a product of ElectroChem, Inc., EC-20-10-7) were adhered. The average peeling strength thereof was 11.1 N/m.

Example 3

A block copolymer having a sodium sulfonate group was obtained in the same manner as in Example 1 except that 7.09 g of 2-methylhydroquinone was used instead of resorcin. The reduction viscosity of the block copolymer was 1.34 dl/g (NMP), while the glass transition temperature was 143° C.

Using the obtained block copolymer, a film having a free sulfonic acid group was obtained in the same manner as in Example 1. The ion exchange group equivalent of the obtained film was 585 g/mole, the weight retention ratio as measured by immersion in a 64 weight % aqueous methanol solution was 95%, the ion conductivity was 0.038 S/cm, and the methanol permeability was 5.1 $\mu mole/cm^2 \cdot min$.

From the obtained block copolymer, powder of a polymer having a free sulfonic acid group was obtained in the same manner as in Example 1. The glass transition temperature of the obtained block copolymer having a free sulfonic acid group was 143° C. With a varnish obtained by dissolving this polymer in the same manner as in Example 1, a crosslinked membrane of polyether ketone containing a sulfonic acid group and a commercially available electrode (a product of ElectroChem, Inc., EC-20-10-7) were adhered. The average peeling strength thereof was 11.6 N/m.

Comparative Example 1

With a varnish containing a commercially available fluorinated polymer having a protonic acid group (Nafion (registered trademark owned by DuPont Kabushiki Kaisha, glass transition temperature: 143° C.)), a crosslinked membrane of polyether ketone containing a sulfonic acid group and a commercially available electrode (a product of ElectroChem, Inc., EC-20-10-7) were adhered. The average peeling strength thereof was 0.2 N/m. The ion exchange group equivalent when Nafion was made into a film was 1,100 g/mole.

Comparative Example 2

A block copolymer having a sodium sulfonate group was obtained in the same manner as in Example 1 except that 14.61 g of TMBPF was used instead of resorcin. The reduction viscosity of the block copolymer was 1.01 dl/g (NMP), while the glass transition temperature was 210° C.

From the block copolymer, a film having a free sulfonic acid group was obtained in the same manner as in Example 1. The ion exchange group equivalent of the obtained film was 722 g/mole, the weight retention ratio as measured by immersion in a 64 weight % aqueous methanol solution was 99%, the ion conductivity was 0.016 S/cm, and the methanol permeability was 1.1 $\mu mole/cm^2 \cdot min$.

From the obtained block copolymer, powder of a polymer having a free sulfonic acid group was obtained by carrying out proton exchange in the same manner as in Example 1. With a varnish obtained by dissolving this polymer powder in the same manner as in Example 1, adhesion of a crosslinked membrane of polyether ketone containing a sulfonic acid group and a commercially available electrode (a product of ElectroChem, Inc., EC-20-10-7) was attempted. Under a temperature set for thermal pressing of 230° C., the crosslinked membrane after adhesion turned black. Under a temperature set for thermal pressing of 140° C., change in the color of the membrane was not observed, but the average peeling strength of the adhesive was 0.8 N.

Example 4

Figure 1:
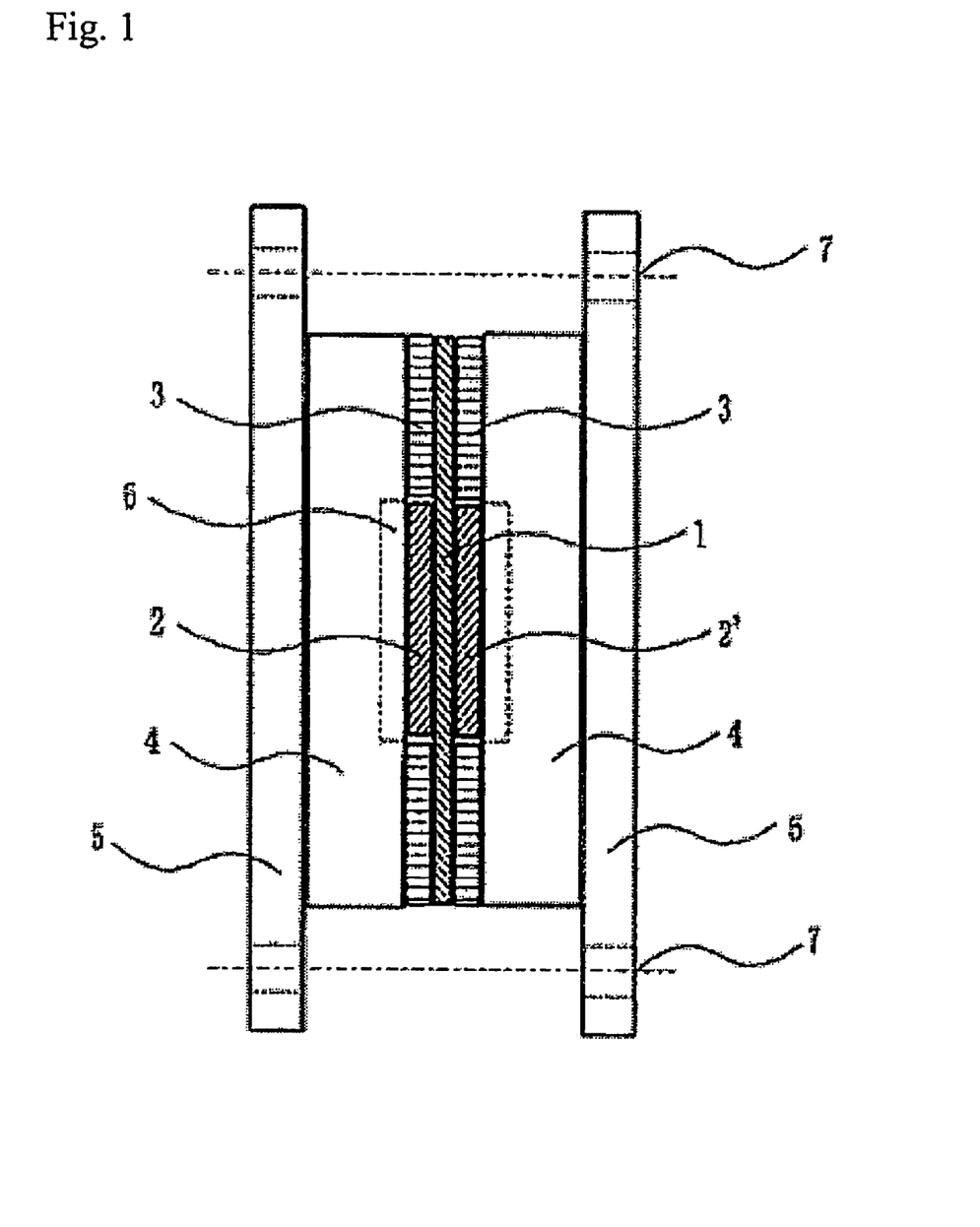
FIG. 1 is a schematic view illustrating a cross-sectional structure of the fuel cell used in Example 4.

Using the varnish of the binder for a fuel cell obtained in Example 1 as an adhesive, a fuel cell shown in FIG. 1 was prepared in accordance with the following manner. The crosslinked membrane of polyether ketone containing a sulfonic acid group was used as an electrolyte membrane 1, a commercially available electrode EC-20-10-7 manufactured by ElectroChem, Inc. was used as an electrode 2, and EC-20-C-7RU manufactured by ElectroChem, Inc. was used as an electrode 2'. The electrode 2, electrolyte membrane 1 and electrode 2' were laminated in this order, placed in a thermal press previously heated at 80° C., and pressure was applied only on the electrode surface at 0.8 MPa. Then, while being pressurized, the assembly was heated from 80 to 140° C. over 8 minutes, and kept at 140° C. for 5 minutes. The electrolyte membrane-electrode assembly after adhesion was almost in a dried state, but no detachment of the electrodes occurred.

The obtained electrolyte membrane-electrode assembly was put into a fuel cell test cell (Grade: EFC-05-REF) manufactured by ElectroChem, Inc., and a fuel cell shown in FIG. 1 was assembled. In FIG. 1, the electrolyte membrane 1 was sandwiched between the catalyst-equipped electrodes 2 and 2' prepared as above using a gasket 3, and further a separator 4 was placed at the outer side thereof, then the entire body was tightly clamped by a clamping bolt 7 using a pressurizing plate 5. A flow channel 6 was provided inside.

Figure 2:
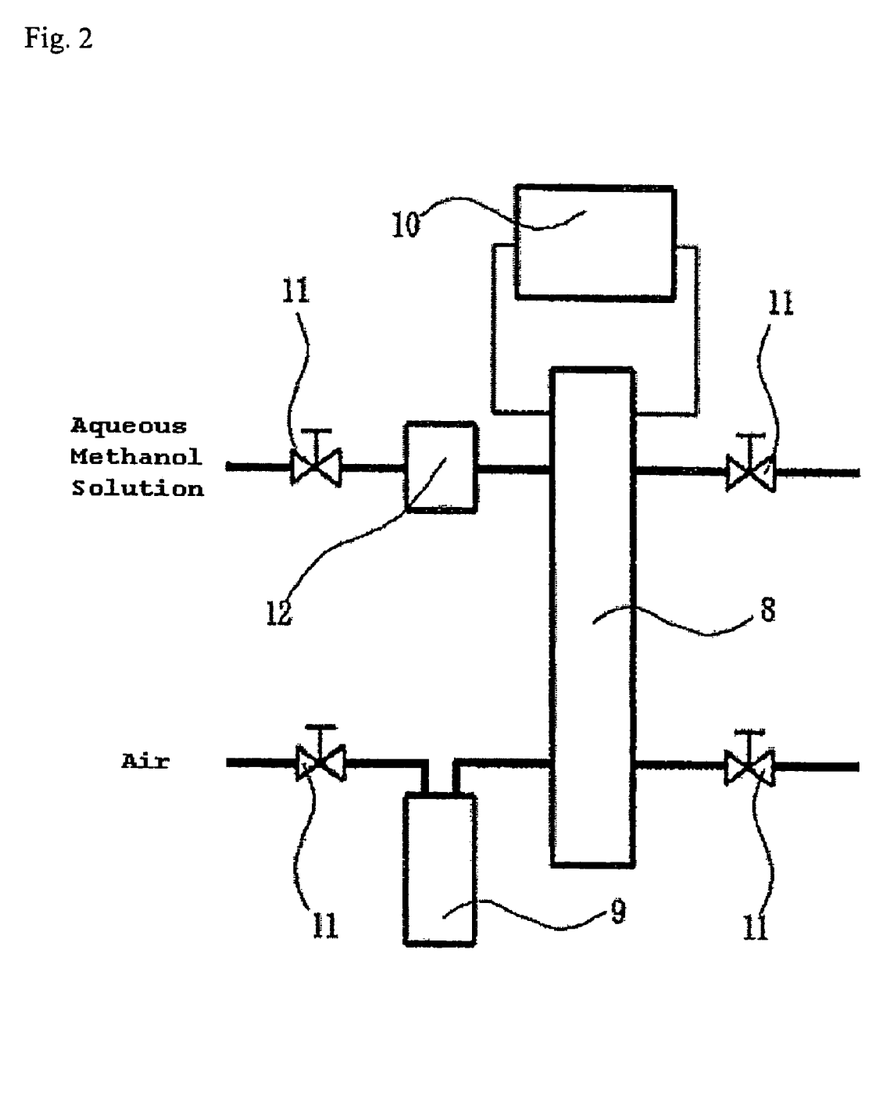
FIG. 2 is a block flow diagram illustrating a fuel cell evaluator used for the evaluation of the fuel cell in Example 4.

After assembly of the cell, cell properties were measured using a fuel cell evaluator as shown in FIG. 2, and a 1M aqueous methanol solution as a fuel. The measurement conditions were 80° C. of fuel cell temperature, 2 cc/min of aqueous methanol solution flow, 0.05 MPa of air pressure and 100 sccm of air flow. The maximum output of about 7.4 mW/cm$^2$ (voltage: 0.20V, current: 36 mA/cm$^2$) was obtained.

In FIG. 2, the fuel cell of FIG. 1 is put into a fuel cell 8. Via the upper line shown in the drawing, an aqueous methanol solution is allowed to flow in a direction from left to right through the fuel cell 8 by a delivery pump 12. Via the bottom line, air humidified by a bubbling tank for humidification 9 is allowed to flow in a direction from left to right through the fuel cell 8. The aqueous methanol solution flows through the flow channel 6 at the fuel electrode side, while air flows through the flow channel 6 at the air electrode side. The amount of each flow is controlled by a mass flow controller 11. Evaluation of the fuel cell is performed by measuring voltage and current density generated by the flow of the aqueous methanol solution and air using an electronic load 10. After the power generating test, the cell was disassembled to observe the electrolyte membrane-electrode assembly. No detachment of the electrolyte and the electrodes was found.

Example 5

5-1) Preparation of an Air Electrode (Positive Electrode)

10 g of a varnish was obtained by dissolving 0.5 g of the block copolymer powder subjected to proton exchange obtained in Example 1, as a binder, in a mixed solvent of 5.0 g of distilled water and 4.5 g of tetrahydrofuran. The varnish was mixed with 0.5 g of 20 wt % Pt-supported catalyst (name: IFPC20) manufactured by Ishifuku Metal Industry Co., Ltd, then the mixture was stirred after applying an ultrasonic wave thereto to obtain a composition for forming an electrode for an air electrode catalyst.

A catalyst composition for forming an electrode was applied onto the carbon paper (grade: TGP-H-060) manufactured by Toray Industries, Inc. using an applicator, then vacuum-dried at 70° C. for 12 hours and cut in a size of 5 cm² to obtain an electrode. The application amount of the catalyst was 2 mg/cm² in terms of the amount of Pt.

5-2) Preparation of a Fuel Electrode (Negative Electrode)

10 g of a varnish was obtained by dissolving 0.5 g of the block copolymer powder subjected to proton exchange obtained in Example 1, as a binder, in a mixed solvent of 5.0 g of the distilled water and 4.5 g of tetrahydrofuran. The varnish was mixed with 0.5 g of 30 wt % PtRu-supported catalyst (name: IFPC30A) manufactured by Ishifuku Metal Industry Co., Ltd., then the mixture was stirred after applying an ultrasonic wave thereto to obtain a composition for forming an electrode for a fuel electrode catalyst.

A catalyst composition for forming an electrode was applied onto the carbon paper (grade: TGP-H-060) manufactured by Toray Industries, Inc. and vacuum-dried at 70° C. for 12 hours, then cut in a size of 5 cm² to obtain an electrode. The application amount of the catalyst was 2 mg/cm² in terms of the amount of PtRu.

5-3) Preparation of an Assembly and Power Generating Test

Using the electrode prepared in 5-1) as the electrode 2 and the electrode prepared in 5-2) as the electrode 2', an electrolyte membrane-electrode assembly was prepared in the same manner as in Example 4. Detachment of the electrodes did not occur. A power generating test was conducted in the same manner as in Example 4, using a 1M aqueous methanol solution as a fuel to measure the cell properties. The maximum output of about 6.1 mW/cm² (voltage: 0.19 V, current: 32 mA/cm²) was obtained. After the power generating test, the cell was disassembled to observe the electrolyte membrane-electrode assembly. No detachment of the electrolyte membrane and electrodes was found.

REFERENCE NUMBERS IN THE DRAWINGS

1 Electrolyte membrane
2, 2' Catalyst-equipped electrodes
3 Gasket
4 Separator
5 Pressurizing plate
6 Flow channel
7 Clamping bolt
8 Fuel cell
9 Bubbling tank for humidifying
10 Electronic load
11 Mass flow controller
12 Delivery pump

The invention claimed is:

1. A fuel cell comprising a binder comprising a block copolymer which comprises a first block having a first repeating structural unit represented by following formula (1):

and a second block having a second repeating structural unit represented by any one of following formulae (2) to (4):

which has a glass transition temperature (Tg) of 180° C. or less, wherein the binder bonds an electrode of the fuel cell and an electrolyte membrane.

2. The fuel cell as set forth in claim 1, wherein said block copolymer has an ion exchange group equivalent of from 200 to 1,000 g/mole and a weight retention ratio of 90% or more as measured by immersion in a 64 weight % aqueous methanol solution at 25° C. for 24 hours.

* * * * *